(12) United States Patent
Birk et al.

(10) Patent No.: US 6,705,643 B2
(45) Date of Patent: Mar. 16, 2004

(54) FOOT PROTECTION DEVICE

(75) Inventors: Karl Birk, Ebersbach (DE); Norbert Ellerbrok, Rudersberg (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/085,522

(22) Filed: Feb. 28, 2002

(65) Prior Publication Data

US 2002/0132088 A1 Sep. 19, 2002

(30) Foreign Application Priority Data

Mar. 13, 2001 (DE) .......................... 201 04 280

(51) Int. Cl.⁷ ................................ B32B 3/30
(52) U.S. Cl. ................ 280/748; 428/161; 428/163; 428/172
(58) Field of Search ................ 180/90.6; 280/748; 296/75; 74/564; 428/172, 161, 163

(56) References Cited

U.S. PATENT DOCUMENTS 6,349,965 B1 * 2/2002 Heilig .................... 280/478

FOREIGN PATENT DOCUMENTS

| DE | 19727598 A1 | 1/1999 |
| DE | 29823235 U1 | 6/1999 |
| WO | WO9805534 | 2/1998 |

* cited by examiner

Primary Examiner—Alexander S. Thomas
(74) Attorney, Agent, or Firm—Tarolli, Sundheim, Covell & Tummino L.L.P.

(57) ABSTRACT

The invention relates to a foot protection device for vehicle occupants. The protection device comprises a foot support piece which can support the occupant's feet, a base piece by which the foot protection device can rest on a floor of a vehicle, and an adjustment device to displace the foot support piece in a first direction parallel to the base piece. Ramp surfaces are constructed on at least one of the base piece and the foot support piece, which with a displacement of the foot support piece by the adjustment device bring about a movement of the foot support piece in a second direction that is perpendicular to the first direction.

5 Claims, 4 Drawing Sheets

FOOT PROTECTION DEVICE

BACKGROUND OF THE INVENTION

Foot protection devices for vehicle occupants serve to protect the lower extremities against injuries by the penetration of the vehicle floor or the splash-board in an accident. In DE 298 23 235 U1 there is proposed a vehicle safety device which can serve to protect the feet of an occupant by moving a section of the vehicle floor towards the feet of the vehicle occupant in the case of being activated. This can take place either in that a double vehicle floor is provided, between the layers of which a gas bag is situated, which is inflated in the case of being activated and thus raises the vehicle floor. As a second solution, an inner insert plate is proposed which is connected with the vehicle floor by means of hinge levers and in the case of being activated is moved by a linear drive parallel to the floor, the hinge levers being set up on displacement and raising the floor. Both solutions are relatively complicated and involve a high expenditure in terms of components.

BRIEF SUMMARY OF THE INVENTION

It is an object of the invention to provide a foot protection device for vehicle occupants which is simple to produce and manages with a small number of components.

This is achieved in a foot protection device which comprises a foot support piece which can support the occupant's feet, a base piece by which the foot protection device can rest on a floor of a vehicle, and an adjustment device to displace the foot support piece in a first direction parallel to the base piece. Ramp surfaces are constructed on at least one of the base piece and the foot support piece, which with a displacement of the foot support piece by the adjustment device bring about a movement of the foot support piece in a second direction that is perpendicular to the first direction.

Further advantageous developments of the invention will be apparent from the sub-claims.

DETAILED DESCRIPTION OF THE PREFERRED EMBODIMENTS

Figure 1:
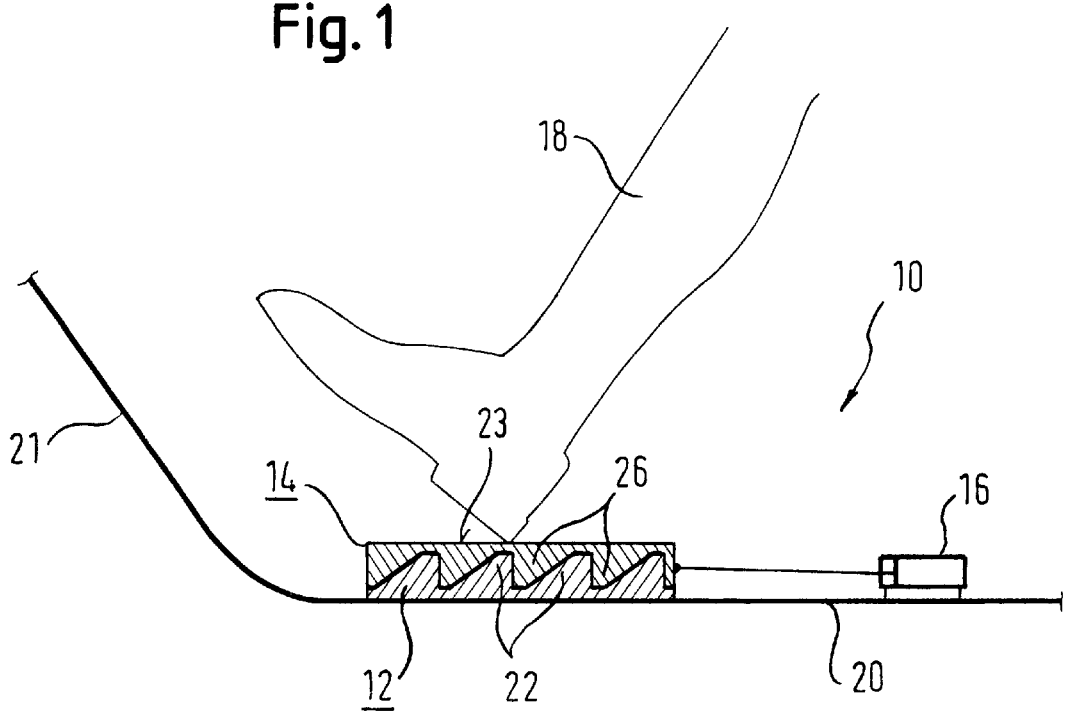
FIG. 1 shows a cross-section through a foot protection device according to a first embodiment of the invention in the non-activated state.
Figure 2:
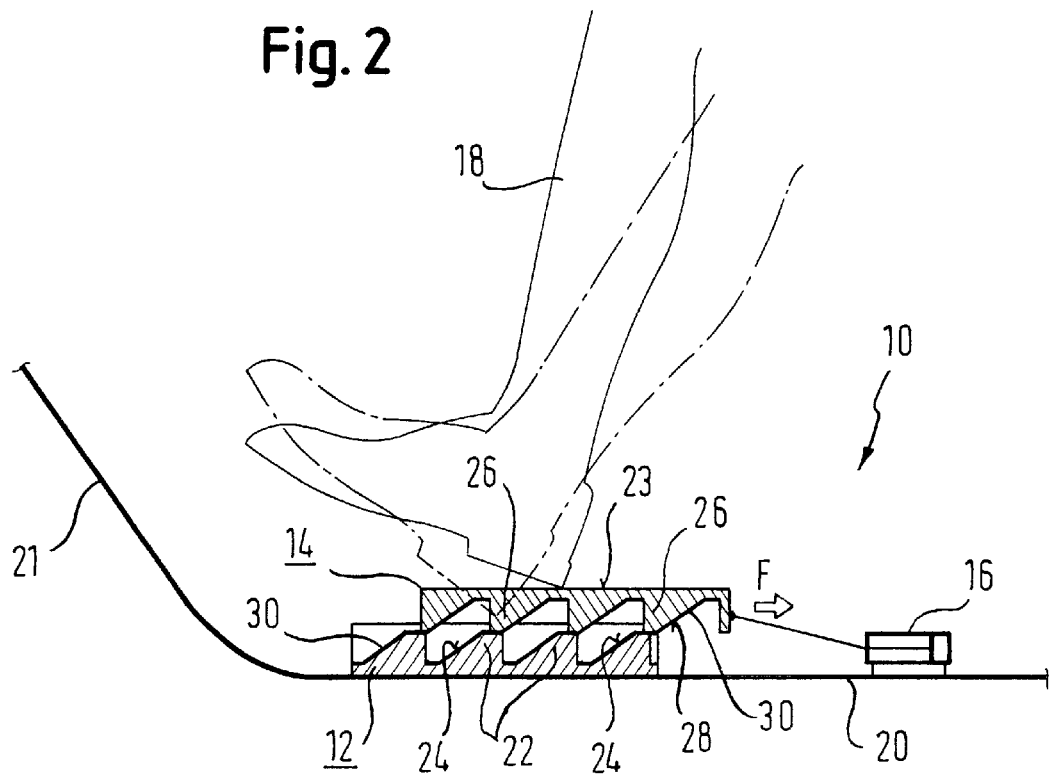
FIG. 2 shows a cross-section through the foot protection device of FIG. 1 in the activated state.

The foot protection device 10 illustrated in FIGS. 1 and 2 has a base piece 12, a foot support piece 14 and an adjustment device 16. In the Figures, the foot 18 of a vehicle occupant is indicated. The base piece 12 lies on the floor 20 of a vehicle in the foot region behind a splashboard 21 and is fastened for example by means of guides, through screws or gluing to the floor 20. Advantageously, the base piece 12 can also be adapted on its underside, pointing towards the floor 20, to the shape of the floor 20 such that it is connected therewith in a form-fitting manner. On the upper side of the base piece 12, ribs 22 are constructed which form ramp surfaces 24 extending obliquely. The ramp surfaces 24 run obliquely upwards in the direction towards the body of the vehicle occupant and contrary to the direction of travel (to the right in the Figures), so that the cross-section through the base piece 12 is a sawtooth profile.

The foot support piece 14 has a flat support surface 23 facing the foot 18 of the vehicle occupant, on which support surface 23 the foot 18 can rest. On the foot support piece 14, ribs 26 are constructed on the opposite profile side, with ramp surfaces 28 which are complementary to the ribs 22 on the upper side of the base piece 12, so that the ribs 26 engage into the intermediate spaces between the ribs 22 and the ramp surfaces 24 and 28 lie one over another. The surfaces of the base piece 12 and of the foot support piece 14, which lie opposite each other, are each provided with an anti-friction layer 30 which consists for example of a foil or a metal sheet.

The adjustment device 16 is firmly arranged on the floor of the vehicle and is connected to an end of the foot support piece 14, so that it can exert a traction F on the foot support piece 14, in order to move the latter. In the Figures, the adjustment device 16 is illustrated diagrammatically as a piston/cylinder unit. For the actual construction a mechanical, pyrotechnic, pneumatic or motor-driven adjustment device can be provided.

The displacement direction and accordingly the alignment of the ramp surfaces 24 and 28 are basically arbitrary, however in the alignment which is shown, advantageously an additional protective effect is produced for the foot 18 through the movement contrary to the direction of travel.

With actuation of the foot protection device, the adjustment device 16 is activated and moves the foot support piece 14 parallel to the base piece 12 contrary to the direction of travel. In so doing, the ramp surfaces 24 and 28 slide on each other, so that the foot support piece 14 is moved by the adjustment device 16 in a second direction which is perpendicular to the direction of displacement, namely upwards, and closer to the foot 18 of the vehicle occupant (FIG. 2). Thereby it is achieved that the foot 18 is situated at a higher, more distant position to the floor 20 or to the splashboard 21.

Both the base piece 12 and the foot support piece 14 can consist, at advantage, of a foamed plastic or metal. Such materials offer the advantage that through deformation they can additionally absorb kinetic energy from the feet 18. In addition, they are simple to produce as shaped pieces from the said materials.

Figure 3:
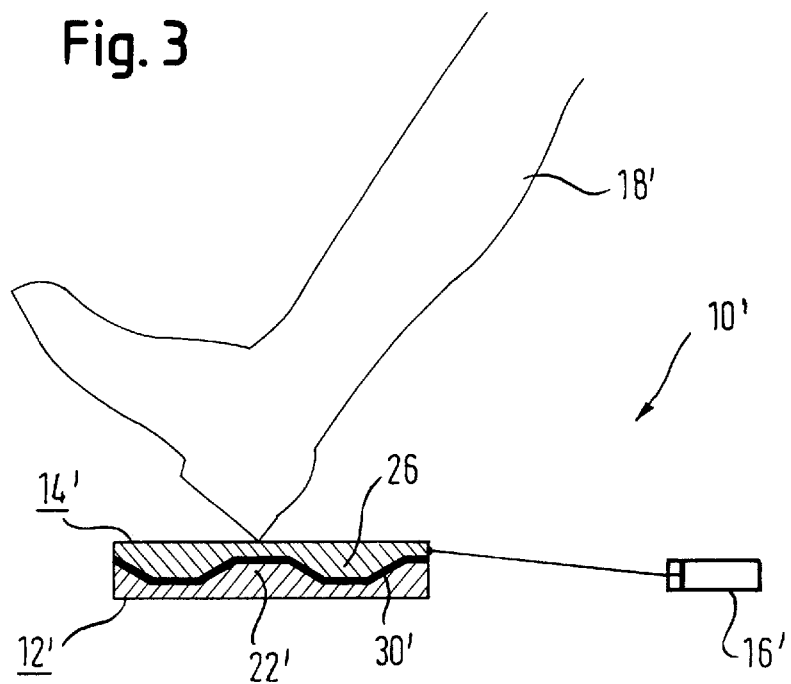
FIG. 3 shows a cross-section through a foot protection device according to a second embodiment of the invention in the non-activated state.
Figure 4:
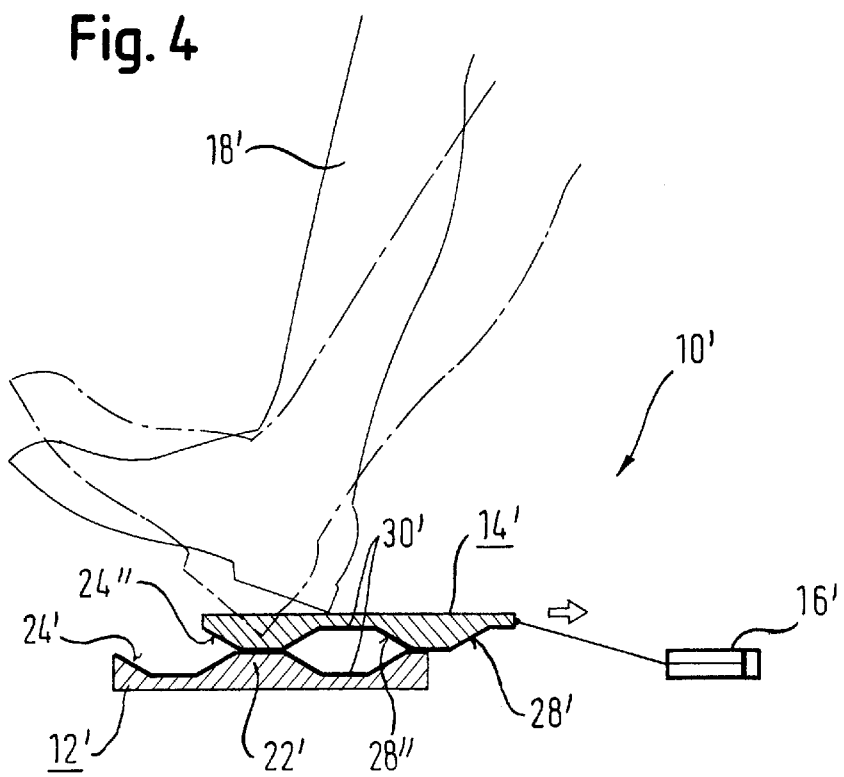
FIG. 4 shows a cross-section through the foot protection device of FIG. 3 in the activated state.
Figure 5:
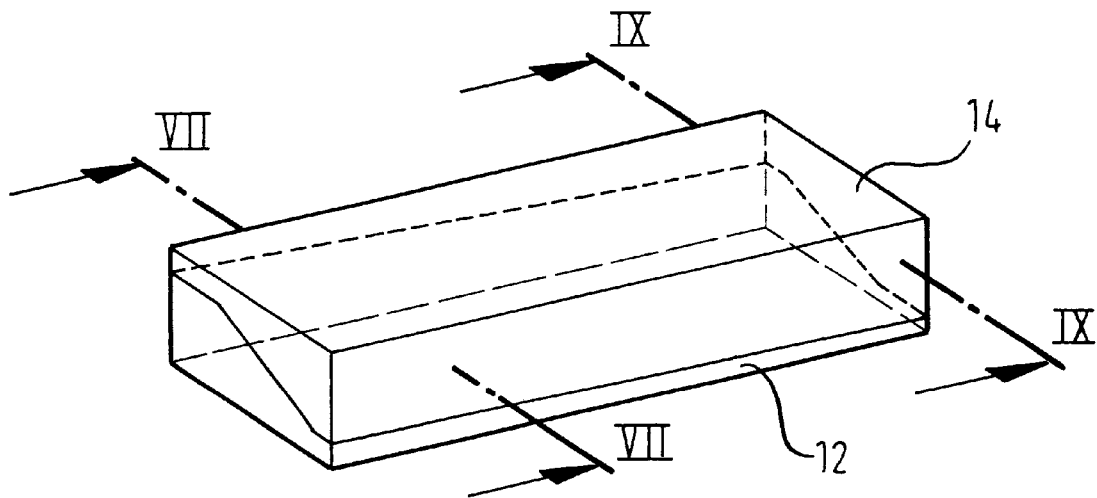
FIG. 5 shows in a perspective view a foot protection device according to a third embodiment of the invention in the non-activated state.
Figure 6:
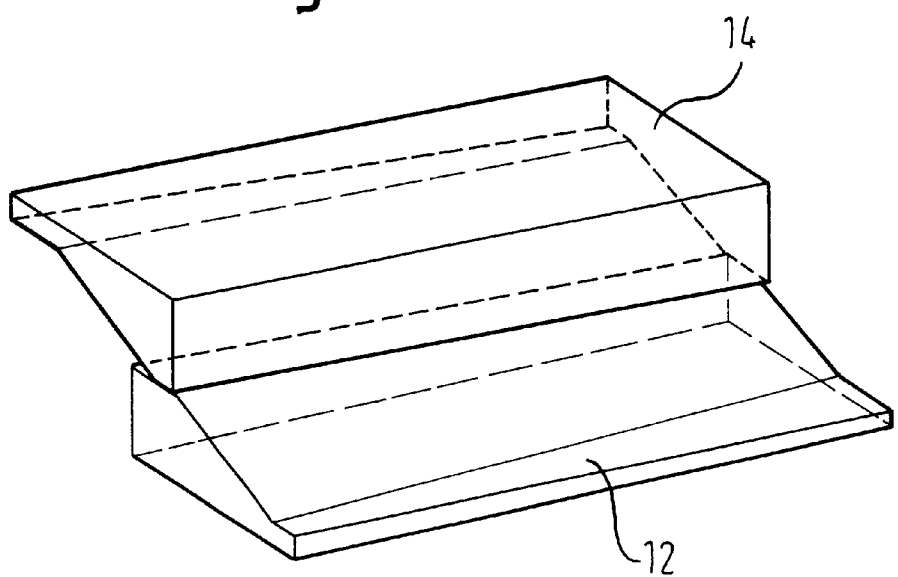
FIG. 6 shows in a perspective view the foot protection device of FIG. 5 in the activated state.
Figure 7:
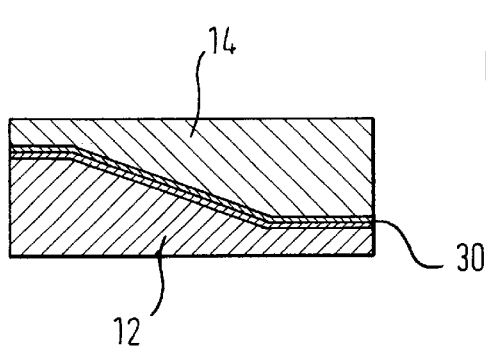
FIG. 7 shows a section taken along plane VII—VII of FIG. 5, the foot protection device being in the non-activated state.

In FIGS. 3 and 4 a second embodiment of a foot protection device 10' according to the invention is illustrated. In this embodiment, the base piece 12' and foot support piece 14' are provided with ribs 22' or 26 with a trapezoidal cross-section. Therefore, on the surfaces, facing each other, of base piece 12' and foot support piece 14' on the one hand ramp surfaces 24' or 28' are formed, which are inclined obliquely upwards and contrary to the direction of travel, and also on the other hand ramp surfaces 24" and 28" which are inclined in opposite orientation. This construction offers the possibility of connecting the adjustment device 16' either with the end lying towards the front in the direction of travel or with the opposite end of the foot support piece 14', so that for example for various installation situations the same assembly of base piece 12' and foot support piece 14' can be used.

In FIGS. 5 to 10 there is shown a third embodiment of a foot protection device according to the invention. Here too, a base piece 12 and a foot support piece 14 are again used that can be shifted relative to each other. Here too, the surfaces, lying opposite each other, of the base piece 12 and the foot support piece 14 may each be provided with an anti-friction layer 30.

Figure 8:
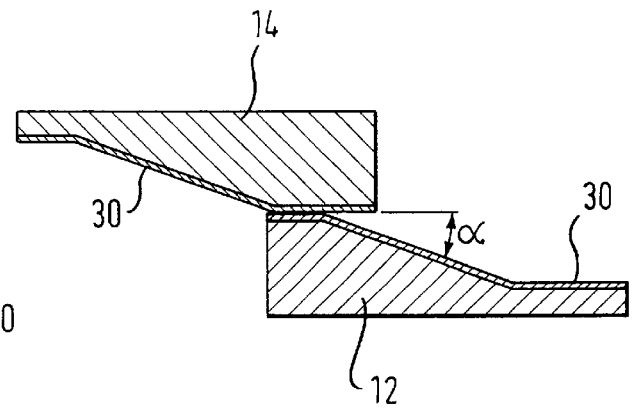
FIG. 8 shows a view corresponding to that of FIG. 7, the foot protection device now being in the activated state.
Figure 9:
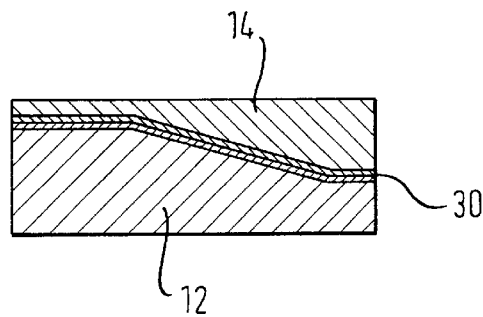
FIG. 9 shows a section taken along plane IX—IX of FIG. 5, the foot protection device being in the non-activated state.
Figure 10:
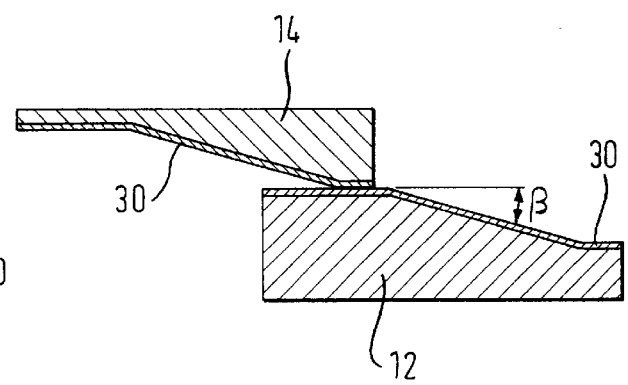
FIG. 10 shows a view corresponding to that of FIG. 9, the foot protection device now being in the activated state.

The special feature of the third embodiment is that the inclined portion provided on the base piece 12 and the foot support piece 14, respectively, has a variable angle of inclination. This can be seen particularly clear by comparing FIGS. 8 and 10, which show a cross-section through the end portions, lying opposite each other, of the base piece and the foot support piece. The angle $\alpha$ indicated in FIG. 8 is significantly larger than angle $\beta$ indicated in FIG. 10. Having slopes differing from each other, it is possible to achieve differing levels, for example, for the right and left leg of an occupant. Moreover, through the resultant contour there are achieved differing kinematic conditions for the feet. It is in this way that the risk of injury may be specifically adapted to vehicular circumstances. To give an example, the influence of the brake pedal may be taken into account.

If base piece or foot support piece consist of a foamed material, then the elastic behavior of the foam may be made use of. By providing guiding ledges in the region of the sheet metal base or between the individual foam layers, it is possible to achieve a constrained compression of the material. This results in a structure which is more dense. This effect may be used for the heel being hit at an earlier point in time.

What is claimed is:

1. A foot protection device for vehicle occupants, said protection device comprising a foot support piece which can support at least one of said occupant's feet, a base piece by which said foot protection device can rest on a floor of a vehicle, and an adjustment device to displace said foot support piece in a first direction parallel to said base piece, ramp surfaces being constructed on said base piece and said foot support piece, said ramp surfaces on said base piece sliding on said ramp surfaces on said foot support piece upon displacement of said foot support piece by said adjustment device to cause said foot support piece to move upward and rearward in said vehicle.

2. The foot protection device according to claim 1, wherein said base piece and said foot support piece are separated by at least one layer, which reduces friction between said base piece and said foot support piece.

3. The foot protection device according to claim 1, wherein at least one of the components base piece and foot support piece consists of a foamed, energy-absorbing material.

4. The foot protection device according to claim 1, wherein said base piece has a shape, said shape being adapted such that said base piece can be connected in a form-fitting manner with said floor of said vehicle.

5. The foot protection device according to claim 1, wherein said base piece has an inclined portion, said inclined portion having an angle of inclination which is variable throughout the inclined portion.

\* \* \* \* \*